United States Patent [19]
Smits

[11] Patent Number: 6,125,115
[45] Date of Patent: *Sep. 26, 2000

[54] TELECONFERENCING METHOD AND APPARATUS WITH THREE-DIMENSIONAL SOUND POSITIONING

[75] Inventor: Gerard Dirk Smits, Los Gatos, Calif.

[73] Assignee: QSound Labs, Inc., Canada

[*] Notice: This patent issued on a continued prosecution application filed under 37 CFR 1.53(d), and is subject to the twenty year patent term provisions of 35 U.S.C. 154(a)(2).

[21] Appl. No.: 09/022,952

[22] Filed: Feb. 12, 1998

[51] Int. Cl.$^7$ ........................................ H04R 5/00
[52] U.S. Cl. ........................ 370/389; 370/260; 381/17; 381/310
[58] Field of Search ................... 370/260, 261, 370/263, 265, 266, 267, 389; 709/204, 207, 205; 379/93.01; 381/17, 25, 310; 369/4

[56] References Cited

U.S. PATENT DOCUMENTS

| | | | |
|---|---|---|---|
| 4,100,377 | 7/1978 | Flanagan | 179/15 |
| 4,696,036 | 9/1987 | Julstrom | 381/22 |
| 4,771,425 | 9/1988 | Baran et al. | 370/85 |
| 4,815,132 | 3/1989 | Minami | 381/1 |
| 4,817,149 | 3/1989 | Myers | 381/1 |
| 4,969,184 | 11/1990 | Gordon et al. | 379/100 |
| 5,020,098 | 5/1991 | Celli | 379/202 |
| 5,023,913 | 6/1991 | Matsumoto et al. | 381/63 |
| 5,027,687 | 7/1991 | Iwamatsu | 84/600 |
| 5,105,462 | 4/1992 | Lowe | 381/17 |
| 5,245,589 | 9/1993 | Abel et al. | 367/136 |
| 5,283,819 | 2/1994 | Glick et al. | 379/93.01 |
| 5,331,587 | 7/1994 | Abel et al. | 364/825 |
| 5,430,690 | 7/1995 | Abel | 367/135 |
| 5,438,623 | 8/1995 | Begault | 381/17 |
| 5,444,676 | 8/1995 | Balsamo et al. | 369/4 |
| 5,457,685 | 10/1995 | Champion | 370/62 |
| 5,473,363 | 12/1995 | Ng et al. | 348/15 |
| 5,487,113 | 1/1996 | Mark et al. | 381/17 |
| 5,524,110 | 6/1996 | Danneels et al. | 370/62 |
| 5,526,353 | 6/1996 | Henley et al. | 370/60.1 |
| 5,596,644 | 1/1997 | Abel et al. | 381/17 |
| 5,608,786 | 3/1997 | Gordon | 379/100 |
| 5,610,920 | 3/1997 | Doll et al. | 370/389 |
| 5,617,539 | 4/1997 | Ludwig et al. | 709/205 |
| 5,854,898 | 12/1998 | Riddle | 395/200.61 |
| 5,878,145 | 3/1999 | Adams | 381/17 |
| 5,943,427 | 8/1999 | Massie et al. | 381/17 |
| 6,021,206 | 2/2000 | McGrath | 381/310 |

FOREIGN PATENT DOCUMENTS

WO 95/31881  11/1995  WIPO ..................................... 381/17

OTHER PUBLICATIONS

Kendall, "A 3D Sound Primer: Directional Hearing and Stereo Reproduction", Computer Music Journal, pp. 23–46, Dec. 1995.

M.Billinghurst, A Wearable Spatial Conferencing Space, 1998 IEEE, 76–83, Jul. 1998.

*Primary Examiner*—Hassan Kizou
*Assistant Examiner*—John Pezzlo
*Attorney, Agent, or Firm*—Sheridan Ross P.C.

[57] ABSTRACT

A computer network teleconferencing system is provided in which audio signals are coupled to or associated with source indicators, such as source addresses in TCP protocol packets. Three-dimensional spatialization transforms are applied to audio data according to the source of such data so that, upon reproduction, a listener perceives different participants as being located in different spaced-apart locations within a 3-D spatialization region. Preferably, the user may select or modify the apparent location of the teleconference participants.

15 Claims, 4 Drawing Sheets

TELECONFERENCING METHOD AND APPARATUS WITH THREE-DIMENSIONAL SOUND POSITIONING

The present invention relates to teleconferencing which uses three-dimensional spatialization to simulate the apparent audio position of teleconference participants, and in particular, to such teleconferencing over a computer network, as opposed to, e.g., exclusively using telephone equipment.

BACKGROUND INFORMATION

In teleconferencing, audio from two or more different sources is reproduced in at least a third location, preferably with each of three or more locations being able to reproduce audio from the others. Teleconferencing involving four or more participants is also known, although many previous systems had a relatively low limit on the number of participants owning to limited bandwidth of the transmission medium. Accordingly, it would be useful to provide a teleconferencing system in which the bandwidth of the medium is less restrictive on the number of participants than many previous systems.

In a number of previous systems, the only indications of which participant or participants were speaking (or otherwise providing audio information) at a given time was information inherent in the audio signal itself, such as a recognizable tone of voice or the like. In particular, many previous systems summed the audio input from various participants into a single audio signal for monaural reproduction, such that spatialization information was not provided for helping to distinguish participants. Accordingly, it would be useful to provide a system to enhance the ability to recognize participants, such as providing location or spatialization information in reproducing audio signals in a teleconference, especially where this can be achieved with little or no impact on the number of participants permitted and/or bandwidth required.

Some previous systems which have attempted to provide stereophonic panning (but, typically, not three-dimensional spatialization) in the reproduction of remote audio signals have required installation of special equipment such as phase analyzers to achieve this goal. Some such systems require transmission, across the transmission medium, of information indicating relative position, at a single source, of audio signals, thus decreasing the bandwidth available for the audio signal itself compared to the bandwidth used for normal (non-stereo-panning) transmissions. Accordingly, it would be useful to provide a system for teleconferencing with the ability to provide spatial indications but without requiring installation of special hardware and without diminishing the amount of bandwidth otherwise available, or the transmission medium, for audio signals.

A number of audio transmission protocols currently in use couple audio information with information indicative of the identity of the source. One example is packet-switched audio protocols, in which each packet, in addition to containing a certain amount of audio information (typically digitized), also includes information (typically digital in form) indicative of the source (and typically, the destination) of the signal. This information regarding source is used for a number of purposes such as permitting concatenation of several packets from the same source to permit substantially continuous reproduction of a packetized audio signal. However, because such source information was not previously used for providing location cues during audio reproduction, previous systems made only a single use of such location information. Accordingly, it would be useful to provide a system in which location information can be used for more than one purpose (such as both concatenating packets and spatializing audio reproduction) thus effectively avoiding reduction in bandwidth when achieving such spatialization, since use would be made of data already being provided for another purpose.

In certain previous systems, stereo panning or other identification cues were provided in a fashion that was predetermined or otherwise out of the control of the receiving station or listener (such as being determined by the actual physical location of audio sources with respect to one another). Accordingly, it would be useful to provide a system in which audio location cues or other identification cues could be established at the site of the sound reproduction, such as automatically by the reproduction equipment or in a fashion selectable or adjustable by a listener, preferably arbitrarily in any desired or convenient three-dimensional configuration, and preferably independently of the actual, physical relative location of the audio sources.

SUMMARY OF THE INVENTION

The present invention provides a process for teleconferencing over a computer network (although in at least some embodiments, one or more telephonic participants may also be coupled to the computer network teleconference). At least one station in the computer network is configured for sound reproduction to provide three-dimensional spatialization (although, preferably, multiple locations, and preferably, all computer network participants in the teleconference can provide such three-dimensional spatialization of reproduced audio).

It is, in general, known that it is possible to control an audio reproduction system, such as a system including two speakers (either free-standing or in headphones) or more to achieve audio spatialization, i.e. to reproduce a given audio signal in such a fashion that, to a listener in the vicinity of the speakers, the sound is perceived as having a determinable spatial location, preferably a three-dimensional spatial location (i.e., a location which is not limited to a point along a line between two speakers and which preferably can be positioned anywhere in a three-dimensional volume having width, depth, and height in the region of the speakers). Examples of techniques or positioning an audio signal to simulate a desired three-dimensional location are described, e.g., in U.S. Pat. Nos. 5,046,097; 5,105,462; 5,208,860 and 5,371,799, commonly assigned herewith and incorporate herein by reference. In general, by controlling the delay and/or phase with which a signal is reproduced at first and second speakers, certain spatialization effects can be achieved.

According to one embodiment of the invention, audio information is received which is coupled to source identification information. The source identification information is then used to control a three-dimensional spatialization reproduction system, such as that described above, to position the apparent location of at least first and second audio signals, received from first and second remote sources, in two different apparent three-dimensional locations, according to the indicated source for each signal.

In one embodiment, the invention is implemented using a computer, preferably a desktop computer such as a IBM PC (personal computer) or compatible computer, or a workstation computer, equipped for providing at least stereophonic audio reproduction. Such computers currently are widely available and used, including those sold as "multimedia" computers.

Preferably, the present invention can be implemented using software (as described more thoroughly below) without the need for special or additional hardware (i.e. hardware beyond that normally provided in typically-available audio-capable or multimedia computers).

In one embodiment, the invention is configured to work in conjunction with audio signals which provide an indication of a signal source, such as packetized audio information, preferably which is provided according to standards for such packetized information over networks (such as Local Area Networks (LANs), Internet networks or intranet networks). In the case of internet audio information, the information is often provided in a form commonly known as "streaming audio". The audio information may be provided according to standards such as those of the OI1 Standards and Specifications List and/or ITU (International Telecommunications Union) H323, G711, G722, G728, G723 and/or G729.

In one embodiment, the system stores an indication of simulated locations within the three-dimensional spatialization region, each simulated location corresponding to one of the remote participants in a teleconference. For example, when there are two remote audio sources in a teleconference (i.e. in addition to the location of the listener, in the current example) the system will have already stored indications of first and second three-dimensional locations within the spatialization region. Each such location will have associated with it a unique set of spatialization parameters such as phase and delay information, for use in reproducing an audio signal at such location. As audio information is received and, where appropriate, packets concatenated to provide two or more continuous (but not necessarily simultaneous), audio signals the two signals for reproduction are processed to provide each signal with a unique set of reproduction parameters (such as phase and delay parameters) with the result that when the signals are reproduced using the speakers, a listener will be provided with the impression that the audio signals from the first and second remote audio sources are emanating from first and second different positions within the spatialization region. In this way, a participant in a teleconference is provided with spatialization cues to assist in identifying the participants in a teleconference. Preferably, such cues are provided without substantial impact on the effective bandwidth of the network medium available for the audio information, as compared to the bandwidth available for ordinary (non-spatialized) communication of the type. Preferably, the information received at the reproduction station(s) is identical to the information used in non-spatialization systems (i.e. one cannot necessarily distinguish, based on the incoming signals alone, whether spatialization is being used).

DETAILED DESCRIPTION OF THE PREFERRED EMBODIMENT

Figure 1:
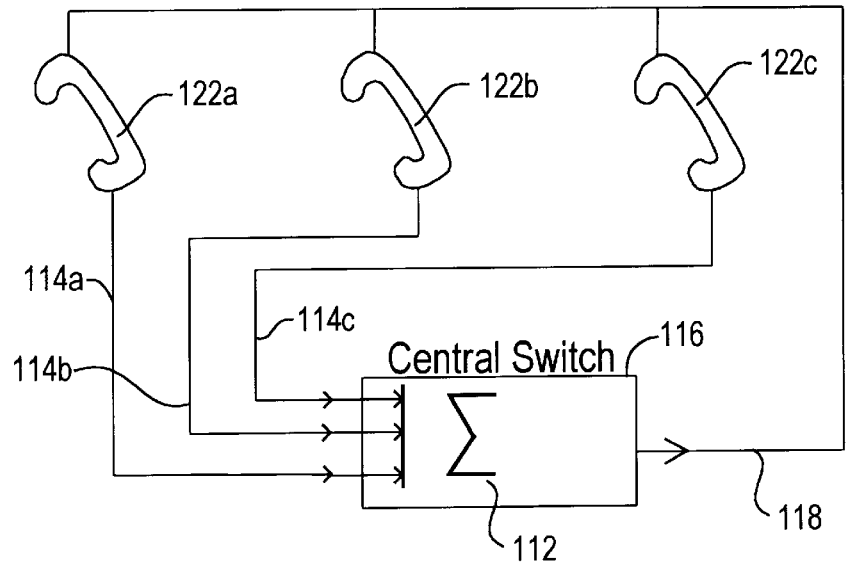
FIG. 1 is a schematic block diagram showing a telephone teleconferencing system according to previous devices.

Before describing embodiments of the present invention, certain features according to previous devices will first be described. Teleconferencing over a telephone system (i.e. using, exclusively, telephone system equipment) according to existing telephony standards, provides a monophonic summation 112 of the signals 114$a,b,c$ at a central switch location 116 with the monophonic output 118 being provided to each of the participants in the telephone conference 122$a,b,c$ (although a telephone handset schematically represents participant locations in FIG. 1, telephone conferencing with speaker-phones and similar reproduction equipment is also used). The mono summation 112 limited the system to monophonic reproduction but provided for a relatively small requirement for dedicated real-time connections and therefore relatively small bandwidth requirements for a telephone conference.

Figure 2:
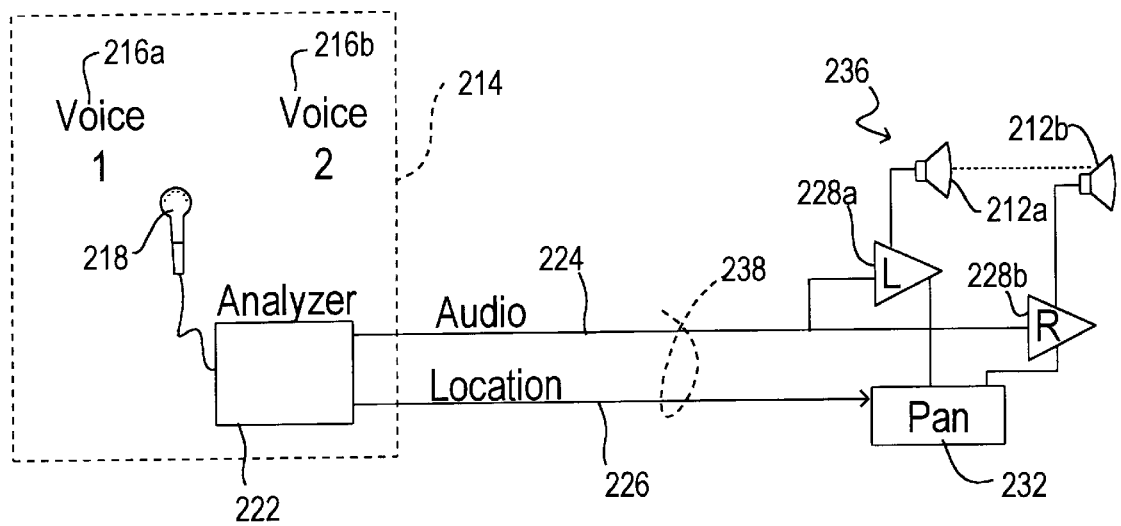
FIG. 2 is a schematic block diagram showing a stereo pan system according to previous devices.

In the configuration of FIG. 2, left and right stereophonic speakers 212$a$, 212$b$ were configured to reproduce an audio signal from remote sources, where at least one of the remote sources 214 received two different voices or other audio inputs 216$a$, 216$b$ over a single microphone 218. In the configuration depicted in FIG. 2, the single signal obtained using the microphone 218 was analyzed electronically 222 (e.g. by sensing phase) to output not only an audio signal 224 but also a location signal 226 indicative of the actual, physical relative location of the two voices 216$a$, 216$b$. The audio signal 224 was provided by left and right amplifiers 228$a$, 228$b$ to the speakers 212$a$, 212$b$ while a pan control 232, responsive to the location signal 226 adjusted gain of the amplifiers 228$a$, 228$b$ to provide a stereo pan so as to place an apparent sound location somewhere along the line segment 234 connecting the speakers 212$a$, 212$b$ in a manner to mimic or indicate the relative physical, actual location of the audio 216$a$, 216$b$. As seen from FIG. 2, the configuration depicted in FIG. 2 requires that, in order for stereo pan to be provided, at the reproduction location 236, additional hardware (i.e. analyzer 222) must be provided at the remote location 214. Furthermore, the location signal 226 which is transmitted across the transmission medium 238 along with the audio signal 224, is a signal which is used only for the stereo pan control purpose, and is not otherwise used and accordingly implementing the system of FIG. 2 requires a reduction in the bandwidth available over the medium 238 for the audio signal 224, compared with the bandwidth available for a corresponding system which does not provide the depicted stereo panning.

Figure 3:
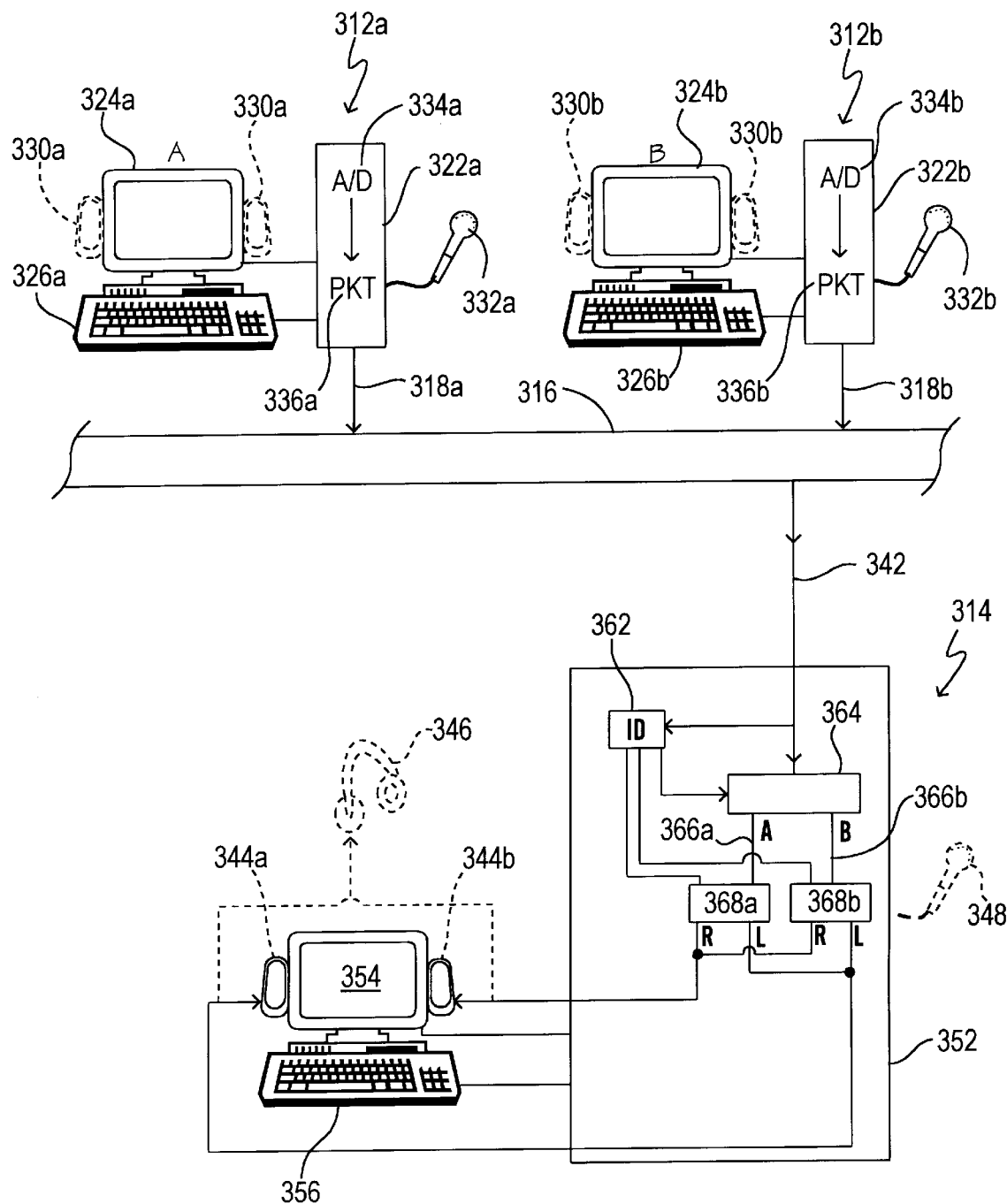
FIG. 3 is a schematic diagram of a network teleconferencing system with three-dimensional spatialization according to an embodiment of the present invention.

FIG. 3 depicts, in schematic form, one system for providing location cues in a teleconferencing system according to an embodiment of the present invention. Although the present invention can, at least theoretically, operate with up to an arbitrary number of participants, FIG. 3 depicts a system in which there are two audio source participants 312$a$, 312$b$ and an audio reproduction station 314 coupled via a computer network system 316 such as a Local Area Network (e.g. Ethernet, token-ring, etc.), Internet network, or intranet system. Each of the audio sources 312$a$, 312$b$ provides, to the network 316, audio signals 318$a$, 318$b$ which include not only audio data, but also data indicative of the source of that data (i.e. audio data 318$a$ is coupled or associated with data identifying such audio data as coming from station A while 318$b$ is coupled or associated with data indicating such data as coming from source B.)

Although many schemes or protocols for associating identification information with audio signals are known, or will be apparent to those of skill in the art after reading the present disclosure, the example of FIG. 3 is directed to a protocol of a type which may be implemented on a computer such as a PC or workstation computer, typically having a chassis 322a, 322b coupled to an output device such as a video screen or monitor 324a, 324b, and an input device such as a keyboard 326a, 326b, mouse, or other pointer device, and the like. Each station 312a, 312b, is configured to receive or generate audio information, e.g. through microphones 332a, 332b in a typical configuration, such as those found in multimedia computers. Although, in the present example, stations A and B are at least audio source locations, it is contemplated that, in a typical teleconference situation, locations A and B will also be configured with speakers 330a, 330b, and, preferably, with software or other controls, as described below in connection with the reproduction station 314, such that the same type of location queues provided at reproduction station 314 are also provided at audio sources A and B.

Analog audio signals (e.g. from microphones 332a, 332b) are processed by the computer by an analog-to-digital converter 334a, 334b and the digital audio information is typically packetized 336a, 336b, i.e. divided into discrete groups of data. A number of packetizing protocols are known, typically associated with different types of networks 316. If the data is to be transmitted over the Internet, the audio data may be packetized using, e.g. the transmission control protocol (TCP) or the user datagram protocol (UDP), both of which are known to those of skill in the art.

Regardless of how the audio information is transformed, and in particular regardless of whether and how the information is digitized and/or packetized, the data which is transmitted through the reproduction station 314 is in a form such that, at the reproduction station 314, the audio signal from at least one audio source (or group of audio sources) can be distinguished from the audio signal (s) from at least one other audio source (or group of sources). Typically, the network 316 is configured (or employs protocols) such that the audio signals 318a, 318b are associated with a destination, in particular are associated at least with destination 314, in the example of FIG. 3. For example, in a packetized protocol, each packet will contain, in addition to digitized audio information, a digital indication of source and a digital indication of destination (or destinations). Regardless of how destination is indicated, in the example of FIG. 3, the network is configured so that the audio signals 318a, 318b from stations A and B are routed 342 to the reproduction station 314.

In the depicted embodiment, the audio reproduction station 314 includes a computer, such as a PC, workstation computer, or the like, typically including a chassis 352, output device such as display screen, input device such as keyboard 356, mouse or other pointer device and the like. Audio reproduction station 314 also includes first and second speakers 344a, 344b separately controllable, such as by providing separate right and left input signals. Although reproduction station 314 is depicted as being configured with audio reproduction hardware such as stereo speakers 344a, 344b or headphones 346, it is contemplated that, in a typical teleconference situation, audio reproduction station 314 will also be provided with audio input or generation devices or procedures, such as a microphone or microphones 348.

As the audio data packets (or other audio signals) are routed 342 to the audio reproduction station 314, the source identification information is used to identify 362 or distinguish the audio data from station A from the audio data from station B, such as by distinguishing the source identifiers (e.g. monitoring or decoding the source location) in each data packet (where the data is packetized). In the depicted embodiment, the source location decoder 362 controls an audio decoder 364 which separates the audio signals into those 366a arriving from source location A 312a and those 366b arriving from source location B 312b. Although FIG. 3 depicts the identification of source as resulting in two different output signals 366a, 366b, it is not, in general, necessary to physically separate the signals from the two different sources (A,B) in this manner, and the separation depicted in FIG. 3 is provided only for illustrative purposes. Fox example, the source identifier may directly control a spatialization component 368 which applies different spatialization parameters to different packets, depending on the packet source.

In order to reproduce the signals from sources A and B in such a fashion that a listener will perceive these audio signals as emanating from spaced-apart locations, different data transforms (e.g. different phase and delay transforms) are applied, at spatialization components 368a, 368b to audio data from the two different sources 366a, 366b respectively. The result of each transform is at least two output signals (right signal and left signal) which may be used (after appropriate manipulation such as digital-to-analog conversion) to drive, respectively, the left and right speakers 344a, 344b. Because the differently-sourced signals 318a, 318b were transformed using different parameters (e.g. phase, delay, etc.) e.g. according to audio spatialization techniques which will be understood by those of skill in the art, after reading the present disclosure, and in light of spatialization disclosures such as U.S. Pat. Nos. 5,046,097; 5,105,462; 5,209,860 and 5,371,799, supra, upon reproduction, the listener will perceive those audio signals which originated at source A as located at a first spatial location and those audio signals which originated from source B as located at a second, different location. Similar procedures can be used to provide distinct apparent spatial location for audio signals form three or more locations.

Figure 4:
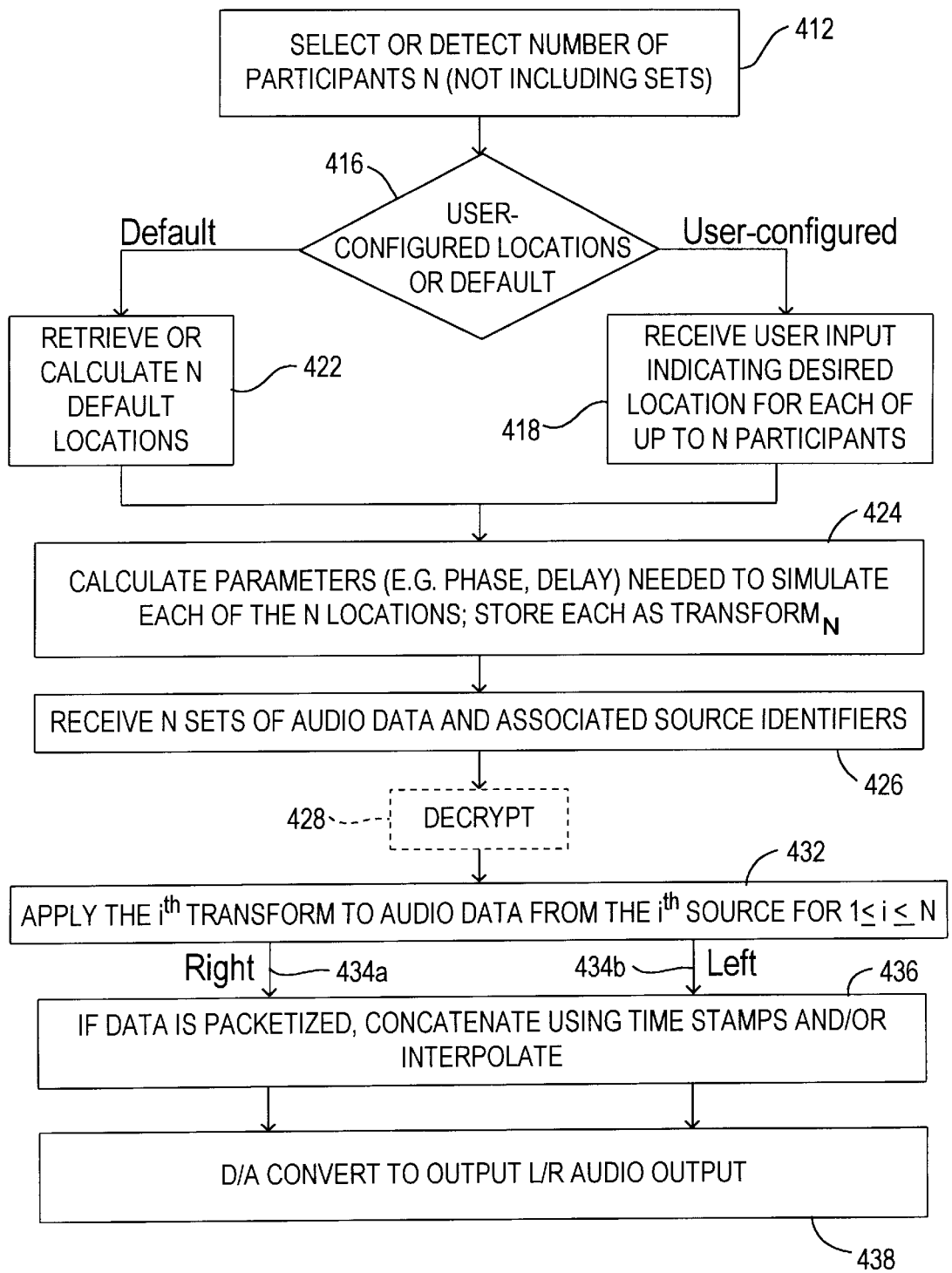
FIG. 4 is a flow chart of a process for teleconferencing according to an embodiment of the present invention.

FIG. 4 depicts a process that may be used in connection with the system depicted in FIG. 3 for providing spatialized teleconferencing. In the embodiment of FIG. 4, the user may select (or the system may detect) the number of participants N in the teleconference 412. Although a system according to the present invention may assign spatial locations according to a default scheme 422 or may be configured to permit a user to assign spatial locations, preferably the system is configured to permit either alternative, such as by allowing a user to configure the locations or, if user configuration is not performed, using a default configuration 416. If user configuration is used, the user may provide input using an input device such as a keyboard 356 (FIG. 3), mouse, or other pointer device, touch-screen, voice-actuated commands, and the like, to indicate a preferred or desired location for each of up to N participants 418. Preferably the user may select locations anywhere in a three-dimensional region. In one embodiment, the software is configured to assist in such user-configuration, e.g. by displaying an indication of the user-selected locations or default locations on the computer screen.

Figure 5:
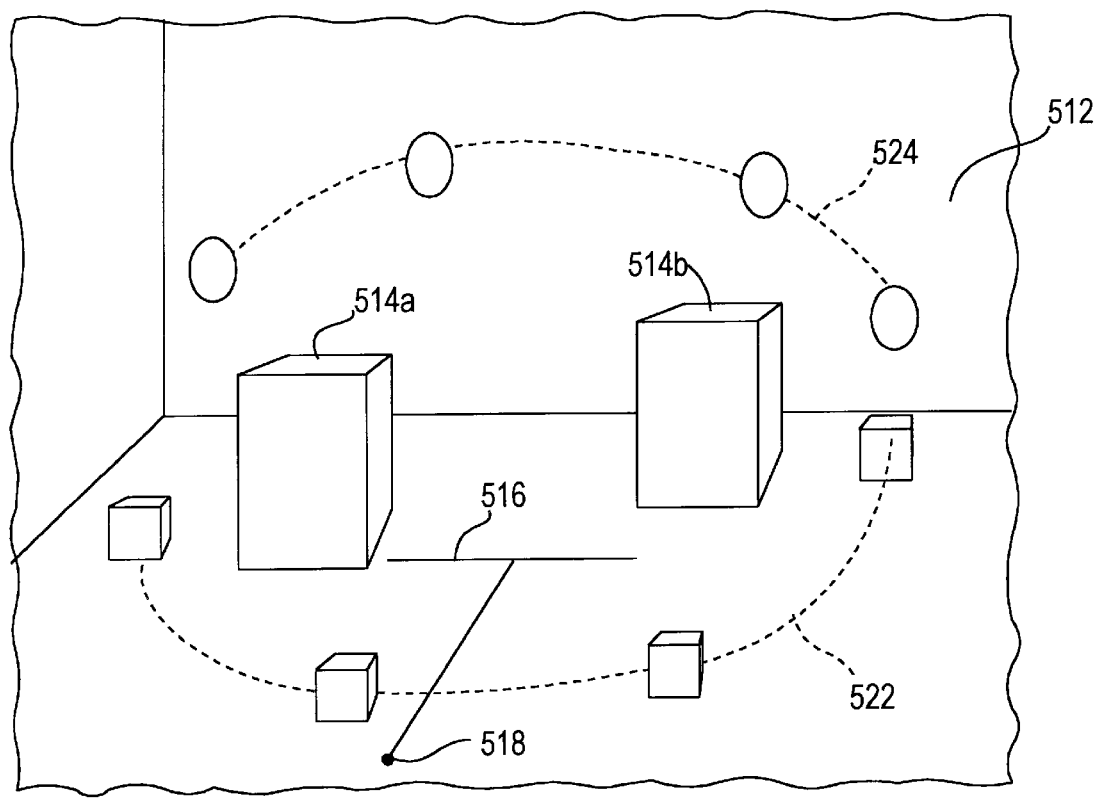
FIG. 5 is a perspective schematic diagram showing examples of location selections in a spatialization region.

FIG. 5 illustrates, in schematic form, two from among the infinite number of possible user-configurable locations with respect to a given listener location 518 (which may be any of a number of locations, but is, for convenience, in FIG. 5 depicted forward of and midway between the speakers 514a, 514b). In the illustration of FIG. 5, the spatialization region 512 is located in a room which includes left and right speakers 514a, 514b. Although the user could select to place participant audio positions along a stereo pan line segment 516 connecting the speakers 514a, 514b, three-dimensional spatialization provides greater flexibility and choice than only stereo pan 516. Three-dimensionality of the spatialization reproduction means that, a number (e.g. four) of positions for participants could be selected by the user to be located, in one depicted example, e.g., along an arc 522 at floor level (or any other level as selected by the user) extending, as shown in the example of FIG. 5, both before and behind the speakers, or in another example, four positions in a vertical arc 524 positioned generally over the speakers. Although the two examples of FIG. 5 show four positions in a horizontal plane and a vertical plane, respectively, the user may select more or fewer positions, including positions which are in a plane tilted along any angle, or positions which do not lie in a plane. Specifically, the user may select positions anywhere in the three-dimensional region 512 in the vicinity of the speakers 514a, 514b.

Figure 6:
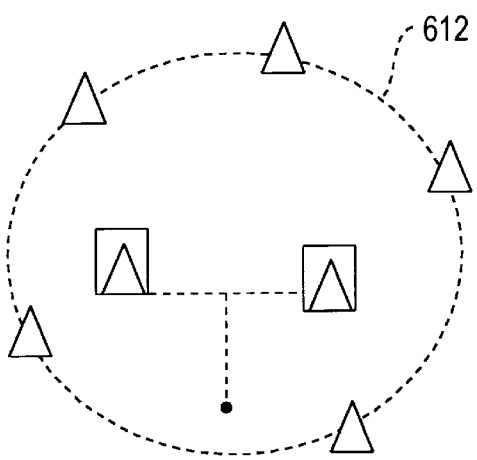
FIG. 6 is a top plan view, in schematic form, of an example of a spatialization location selection according to an embodiment of the present invention.

Another possible selection of locations is depicted in the schematic top plan view of FIG. 6 showing locations substantially along a circle 612 e.g to simulate a "roundtable" discussion.

In the embodiment of FIG. 4, if the user chooses not to designate the locations (or chooses to designate fewer than N locations) one or more default locations will be calculated (or retrieved from memory) by the computer 314 (FIG. 3). For example, the computer may be configured to select locations to define N positions equally spaced around a circle (similar to the configuration depicted in FIG. 6) to provide a roundtable default configuration. It is also possible to provide different default configurations depending, e.g., on the number of participants.

After the locations have been defined, a computer 314 will calculate the transform parameters (such as phase transform, delay transform and the like) which are needed to simulate each of the N locations. The calculated transform parameters are stored 424 so they may be used as described below. The computer 314 receives N sets of audio data, each with associated source identifiers 426 as described above. In situations where some or all of the audio or other data is encrypted, a decrypt procedure is applied 428. As each audio signal or data packet is identified as corresponding to a given source, the appropriate transform (already stored, as described above) is applied to that audio data, for each of the up to N sources 432. The result of the transform is a left audio data stream and a right audio data stream 434a, 434b. If the audio data was packetized, the packetized data is concatenated in the proper order (e.g. using packet time stamps). As is known to those of skill in the art, when packets are found to be missing or delayed, the missing or delayed data, in some configurations, may be simulated by an interpolation procedure, 436. When the audio data received by the computer 314 is digitized audio data, a digital-to-analog conversion is performed and resulting left and right audio output signals 438 are used to drive left and right speakers.

In light of the above description, a number of advantages of the present invention can be seen. The present invention provides identification cues, such as by localizing the voice (or other audio input) of each participant in a teleconference, significantly boosting productivity (over the current summed, monaural standard for telephone teleconferencing). The present invention takes advantage of current protocols, such as switched-packet network environments in which each voice packet includes the sender's address or other identifier. This permits the present invention to be implemented using the same type of audio signals which are already being transmitted over networks. No modification, either hardware or software, is required at the audio source location in order to implement the invention at the recipient location. Only software modification (no hardware modification) is required at the recipient or reproduction location. Although there is no theoretical limit to the number of participants in the teleconference according to the present invention, the bandwidth of the transmission medium such as the network medium 316 may, in a practical system, place bounds on the number of signals or packet sources. It is noted, however, that in a typical conference call, typically, at most a single participant, and rarely more than two participants, speak at the same time. Thus, in a configuration such as packetized audio data systems, multiple participants may be engaged in a teleconference while using only the bandwidth needed for one or two participants, particularly if some or all stations use noise suppression technology (such as minimum voice level detector software) so that there are few, if any, noise-only packages being transmitted (and taking up bandwidth). Since computational burden in the present invention is distributed (location information is decoded by recipient machines rather than, e.g., by a network server or other central computer) there is no computational bottleneck; thus, the computational load will typically not be a factor in limiting the number of participants. Since, in one configuration, all audio signals are monophonic (no audio processing is required at the source) a "plain old telephone service" (POTS) connection participant can be distinguished from network participants (by its lack of associated source identification) thus providing for compatibility with existing standards. Accordingly, the present invention provides the potential for teleconferences which include both POTS participants and network participants. Furthermore, network users with limited bandwidth (or POTS participants) can receive all inputs as N-1 monaural, e.g. summed in analog (for POTS) or decoded to a standard default (e.g. center) for the network participants. If desired, a listener may be permitted to modify or adjust the apparent location of one or more of the participants and/or adjust other characteristics of a participant (volume, tone, and the like) without necessarily affecting audio characteristics of the reproduction of the remaining recipient participants.

A number of variations and modifications of the present invention can be used. It is possible to use some features of the present invention without using other features. For example, it is possible to provide a system which provides localization cues for identifying participants without requiring or permitting the user to select or modify the locations. Although the present invention can be configured to permit the selection of a location within the spatialization region independently of the actual relative location of sources, it is also possible to automatically or manually select the locations to simulate or correspond to actual physical locations of sources. Although embodiments have been described in which each audio source outputs a single monophonic audio signal, it is also possible to configure teleconferencing systems according to the present invention in which one or more of the audio sources provides stereo, quadraphonic or similar signals. Although an example of a process according to the present invention has been provided, it is possible to implement the present invention using a process in which steps are added, deleted, or performed in a different order. For example, it is possible to configure a system in which digital-to-analog conversion is performed before transforms are applied (in which case the transforms must be in an analog rather than digital form). It is possible to concatenate/interpolate packetized data prior to applying transforms. Although packetized audio data has been described, it is possible to provide non-packetized data which is associated with a source indication (such as frequency multiplexing different sources at different frequencies). A number of different transmission media may be used, including using different media at different stages of transmission, including transmission over cable, optical fiber, telephone lines, microwave, infrared, and other transmission media. Although, in the described and depicted embodiment of FIG. 3, both audio sources have source identifiers associated with the respective audio signals, it is possible for the present invention to operate in connection with one or more audio sources which do not have associated source identification information. For example, if, in addition to stations A and B of FIG. 3, one or more ordinary telephone audio signals (POTS) were provided to the reproduction station 314, the reproduction station 314 could assign all audio sources which have no source identifier (summed, if more than one) to a separate spatial location such that, upon reproduction, the listener would perceive audio from source A at first location, audio from source B at a second location, and audio from a telephone source (or, if more than one, summed audio from all telephone sources) at a third location. That is, the present invention may be configured to treat unidentified audio sources as another (in this example, third) source to receive its own reproduction location.

The present invention can be configured to provide source identification cues in addition to, or in place of, the audio spatialization cues described above, including visual cues such as illumination of indicator lights or lamps, displays of participant names or other indicators, photographs and the like, (on the computer screen, or elsewhere) e.g. in response to detection or decoding of packet source identifiers or other source identifiers. If desired, different spatialization procedures or transforms may be applied depending on circumstances, such as using different transforms depending on how many participants are involved in the teleconference or depending on whether reproduction is via speakers or headphones. Although, as noted, the present invention can be implemented entirely in software, it is also possible to use hardware, such as audio-mixer hardware, in connection with implementing the present invention.

Although the present invention has been described by way of a preferred embodiment and certain variations and modifications, other variations and modifications can also be used, the invention being defined by the following claims:

What is claimed is:

1. A process for teleconferencing over a computer network, the network having at least first and second audio sources and at least a first audio reproduction station with at least first and second speakers, each of said first and second audio sources outputting, over said computer network, audio information coupled to source identification information, the process comprising:

receiving, at said first audio reproduction station, first audio information and first source identification information from said first audio source, wherein said first source identification information is coupled to said first audio information such that said first audio information, when received at said first audio reproduction station, can be identified as coming from said first source, and reproducing first audio output at said first audio reproduction station, using said speakers, controlled, using said first source information in said first audio reproduction station, to simulate a location for said first audio information in a first three-dimensional location, using three-dimensional spatialization control; and receiving, at said first audio reproduction station, second audio information and second source identification information from said second audio source, wherein said second source identification information is coupled to said second audio information such that said second audio information, when received at said first audio reproduction station, can be identified as coming from said second source, and reproducing second audio output at said first audio reproduction station, using said speakers, controlled, using said second source information, to simulate a location for said second audio information in a second three-dimensional location, different from said first location, using three-dimensional spatialization control, wherein a listener at said first audio reproduction station can identify the source of reproduced audio by its simulated location;

wherein at least one of said first and second three-dimensional locations is a location which is not along a line between said first and second speakers.

2. A process, as claimed in claim 1, said network also including a second audio reproduction station wherein said location for said first audio information and said location for said second audio information defines a first spatial relationship for said first audio information relative to said second audio information, at said first audio reproduction station, and further comprising:

receiving, at said second audio reproduction station, said first audio information and first source identification information from said first audio source, wherein said first audio information, when received at said second audio reproduction station, can be identified as coming from said first source, and reproducing first audio output at said second audio reproduction station, using speakers at said second audio reproduction station, controlled, using said first source information, to simulate a location for said first audio information in a third three-dimensional location, using three-dimensional spatialization control;

receiving, at said second audio reproduction station, second audio information and second source identification information from said second audio source, wherein said second source identification information, when received at said second audio reproduction station, can be identified as coming from said second source, and reproducing second audio output, using said speakers at said second audio reproduction station, controlled, using said second source information, to simulate a location for said second audio information in a fourth three-dimensional location, different from said first, second or third location, using three-dimensional spatialization control, wherein a listener at said second audio reproduction station can identify the source of reproduced audio by its simulated location; and wherein said third location and said fourth location defines a second spatial relationship for said first audio information relative to said second audio information, at said second audio reproduction station, said second spatial relationship being different from said first spatial relationship such that said spatial relationship of said first audio information relative to said second audio information at said first audio reproduction station is different from said spatial relationship of said first audio information relative to said second audio information at said second audio reproduction station.

3. A process as claimed in claim 1 wherein each of said first and second audio information is a monaural audio signal, and wherein said system is provided in the absence of a need to send a stereo audio signal from either of said first and second audio sources to said audio reproduction station.

4. A process as claimed in claim 1 wherein said reproducing of said first and second audio information comprises applying different transforms to said first and second audio information to provide said simulated first and second locations and wherein said transforms are applied at said audio reproduction station in the absence of a need for spatial encoding of said first and second audio information at said first and second sources.

5. A process for teleconferencing over a computer network, the network having at least first and second audio sources and at least one audio reproduction station with at least first and second speakers, the process comprising:

outputting, from said first audio source, over said computer network, a first plurality of packets, each of said first plurality of packets containing first audio information and first source identification information, outputting, from said second audio source over said computer network, a second plurality of packets, each of said second plurality of packets containing second audio information and second source identification information;

receiving, at said audio reproduction station, at least said first and second plurality of packets;

using said first source information in each of said first plurality of packets, in said audio reproduction station to reproduce said first audio information to simulate a first location for said reproduced first audio information in a first three-dimensional location, using three-dimensional spatialization control; and using said second source information in each of said second plurality of packets, in said audio reproduction station, to reproduce said second audio information to simulate a second location for said reproduced second audio information in a second three-dimensional location, different from said first three-dimensional location, using three-dimensional spatialization control wherein a listener at said audio reproduction station can identify the source of reproduced audio by its simulated location;

wherein at least one of said first and second three-dimensional locations is a location which is not along a line between said first and second speakers.

6. A process, as claimed in claim 5, wherein said computer network is selected from among a local area network, an internet network and an intranet network.

7. A process, as claimed in claim 5, wherein said first and second locations are at least initially selected automatically at said audio reproduction station.

8. A process, as claimed in claim 5, further comprising selecting, via a user input device coupled to said audio reproduction station, at least one of said first and second locations within a three-dimensional space in the region of said first and second speakers.

9. A process, as claimed in claim 5, wherein said first and second locations may be selected independently of relative physical location of said first and second audio sources.

10. A process, as claimed in claim 5, further comprising sending audio information from said audio reproduction station for receipt and reproduction at at least one of said first and second audio sources substantially simultaneously with said steps of using to reproduce said first and second signals at said audio reproduction station.

11. A process, as claimed in claim 10, further comprising sending audio information from at least one location, different from said audio reproduction station, for receipt and reproduction at said one of said first and second audio sources to simulate a first location for reproduced audio from said at least one location in a first three-dimensional location and to simulate a second location for reproduced audio from said audio reproduction station in a second three-dimensional location.

12. A process as claimed in claim 5 wherein said first and second source identification information is used for both of first and second steps wherein said first step includes combining audio information from two or more packets with the same source identification information to reproduce audio information, and said second step includes simulating first and second three-dimensional locations for packets having first and second source identification information, respectively.

13. Apparatus for teleconferencing over a computer network, the network having at least first and second audio sources and at least one audio reproduction station with at least first and second speakers, said first audio source outputting, over said computer network, a first plurality of packets, each of said first plurality of packets containing first audio information and first source identification information, said second audio source outputting, over said computer network, a second plurality of packets, each of said second plurality of packets containing second audio information and second source identification information, the apparatus comprising:

means for receiving, at said audio reproduction station, at least said first and second plurality of packets;

means in said audio reproduction station, using said first source information in each of said first plurality of packets, for reproducing said first audio information to simulate a first location for said reproduced first audio information in a first three-dimensional location, using three-dimensional spatialization control; and means, using said second source information in each of said second plurality of packets for reproducing said second audio information to simulate a second location for said reproduced second audio information in a second three-dimensional location, different from said first three-dimensional location, using three-dimensional spatialization control wherein a listener at said audio reproduction station can identify the source of reproduced audio by its simulated location;

wherein at least one of said first and second three-dimensional locations is a location which is not along a line between said first and second speakers.

14. Apparatus for teleconferencing over a computer network, the network having at least first and second audio sources and at least one audio reproduction station with at least first and second speakers, said first audio source outputting, over said computer network, a first plurality of packets, each of said first plurality of packets containing first audio information and first source identification information, said second audio source outputting over said computer network, a second plurality of packets, each of said second plurality of packets containing second audio information and second source identification information, the apparatus comprising:

a computer, at said audio reproduction station, coupled to said network to receive at least said first and second plurality of packets;

said computer being programmed to:
  use said first source information in each of said first plurality of packets to control reproduction of said first audio information to simulate a first location for said reproduced first audio information in a first three-dimensional location, using three-dimensional spatialization control; and to
  use said second source information in each of said second plurality of packets to reproduce said second audio information to simulate a second location for said reproduced second audio information in a second three-dimensional location, different from said first three-dimensional location, using three-dimensional spatialization control;
wherein a listener at said audio reproduction station can identify the source of reproduced audio by its simulated location;
wherein at least one of said first and second three-dimensional locations is a location which is not along a line between said first and second speakers.

15. A software product, embodied in a computer-readable medium, for teleconferencing over a computer network, the network having at least first and second audio sources and at least one audio reproduction station with at least first and second speakers, said first audio source outputting, over said computer network, a first plurality of packets, each of said first plurality of packets containing first audio information and first source identification information, said second audio source outputting over said computer network, a second plurality of packets, each of said second plurality of packets containing second audio information and second source identification information, the software configured to control a computer at said audio reproduction station to:
  receive at least said first and second plurality of packets;
  use said first source information in each of said first plurality of packets to control reproduction at said first audio information to simulate a first location for said reproduced first audio information in a first three-dimensional location, using three-dimensional spatialization control; and
  use said second source information in each of said second plurality of packets to reproduce said second audio information to simulate a second location for said reproduced second audio information in a second three-dimensional location, different from said first three-dimensional location, using three-dimensional spatialization control;
wherein a listener at said audio reproduction station can identify the source of reproduced audio by its simulated location;
wherein at least one of said first and second three-dimensional locations is a location which is not along a line between said first and second speakers.

* * * * *